United States Patent
Li et al.

(10) Patent No.: US 12,505,139 B2
(45) Date of Patent: Dec. 23, 2025

(54) TOPIC RECOMMENDATION METHOD, COMPUTER DEVICE, AND STORAGE MEDIUM

(71) Applicant: Beijing Bytedance Network Technology Co., Ltd., Beijing (CN)

(72) Inventors: Xiaojie Li, Beijing (CN); Xiongda Zhou, Beijing (CN); Jinghua Li, Beijing (CN); Jing Qu, Beijing (CN); Gongwei Xiao, Beijing (CN); Hao Zeng, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/730,483

(22) PCT Filed: May 10, 2023

(86) PCT No.: PCT/CN2023/093190
§ 371 (c)(1),
(2) Date: Jul. 19, 2024

(87) PCT Pub. No.: WO2023/226760
PCT Pub. Date: Nov. 30, 2023

(65) Prior Publication Data
US 2025/0103635 A1     Mar. 27, 2025

(30) Foreign Application Priority Data
May 26, 2022   (CN) .......................... 202210582953.8

(51) Int. Cl.
*G06F 16/335*   (2019.01)
*G06F 16/338*   (2019.01)

(52) U.S. Cl.
CPC .......... *G06F 16/335* (2019.01); *G06F 16/338* (2019.01)

(58) Field of Classification Search
None
See application file for complete search history.

(56) References Cited

U.S. PATENT DOCUMENTS

| | | | |
|---|---|---|---|
| 2015/0227529 A1 | 8/2015 | Kumthekar et al. | |
| 2017/0169498 A1* | 6/2017 | Kawamura | G06Q 30/0625 |

FOREIGN PATENT DOCUMENTS

| | | |
|---|---|---|
| CN | 107783703 A | 3/2018 |
| CN | 107944033 A | 4/2018 |

(Continued)

OTHER PUBLICATIONS

International Search Report and Written Opinion received for PCT Patent Application No. PCT/CN2023/093190, mailed on Aug. 28, 2023, 12 pages (3 pages of English Translation and 9 pages of Original Document).

(Continued)

*Primary Examiner* — Kannan Shanmugasundaram

(57) ABSTRACT

The present disclosure provides a topic recommendation method and apparatus, a computer device, and a storage medium, and the method includes: in response to satisfying a preset display condition, determining a target book to be displayed under the preset display condition; acquiring a target recommended topic matching the target book; and displaying recommended books and the target recommended topic according to a display manner matching the preset display condition, in which the recommended books at least include the target book.

20 Claims, 8 Drawing Sheets

(56) References Cited

FOREIGN PATENT DOCUMENTS

| | | |
|---|---|---|
| CN | 108255999 A | 7/2018 |
| CN | 110717030 A | 1/2020 |
| CN | 112507252 A | 3/2021 |
| CN | 112667127 A | 4/2021 |
| CN | 113378061 A | 9/2021 |
| CN | 113778295 A | 12/2021 |
| CN | 113836429 A | 12/2021 |
| CN | 113987387 A | 1/2022 |
| CN | 114860919 A | 8/2022 |

OTHER PUBLICATIONS

Office action received from Chinese patent application No. 202210582953.8 mailed on Feb. 23, 2024, 13 pages (5 pages English Translation and 7 pages Original Copy).

* cited by examiner

TOPIC RECOMMENDATION METHOD, COMPUTER DEVICE, AND STORAGE MEDIUM

The present application is a national phase filing of International Patent Application No. PCT/CN2023/093190 filed May 10, 2023, which claims the priority to Chinese Patent Application No. 202210582953.8, filed on May 26, 2022, the disclosures of which are incorporated herein in their entirety.

TECHNICAL FIELD

Embodiments of the present disclosure relate to a topic recommendation method and apparatus, a computer device, and a storage medium.

BACKGROUND

In e-reading platforms, users can select books of interest for reading. After the users selects the books, if they want to find other books of interest, they can only preview more book descriptions or preview contents in order to find new books of interest, which leads to a low efficiency in finding books of interest.

SUMMARY

Embodiments of the present disclosure at least provide a topic recommendation method and apparatus, a computer device, and a storage medium.

In a first aspect, the embodiments of the present disclosure provide a topic recommendation method, including: in response to satisfying a preset display condition, determining a target book to be displayed under the preset display condition; acquiring a target recommended topic matching the target book; and displaying a recommended book and the target recommended topic according to a display manner matching the preset display condition, in which the recommended book at least includes the target book.

In an optional embodiment, the preset display condition includes at least one of the following: the current display interface being an end-of-chapter page of a book being read, and the current display interface being a book recommendation interface; and the in response to satisfying the preset display condition, determining the target book to be displayed under the preset display condition, comprises: in response to the current display interface being an end-of-chapter page of a book being read, using the book being read as the target book; or in response to the current display interface being a book recommendation interface, acquiring at least one first recommended book, and using the at least one first recommended book as the target book.

In an optional embodiment, the recommended book further includes a second recommended book in response to the current display interface being an end-of-chapter page of a book being read; and the method further includes: determining the second recommended book matching the target recommended topic based on information of respective recommended books in respective topic posts under the target recommended topic.

In an optional embodiment, the acquiring the target recommended topic matching the target book includes: determining candidate recommended topics whose matching degree with the target book is greater than a set threshold; and sorting the candidate recommended topics based on a total number of converted readers corresponding to each of the candidate recommended topics, and determining the target recommended topic from the candidate recommended topics based on a sorting result, in which the total number of converted readers refers to a total number of new users who read books included in the candidate recommended topics after reading the candidate recommended topics.

In an optional embodiment, a matching degree between the target book and any topic is determined by the following step: determining, for any topic, a matching degree between the topic and the target book based on first classification information of the topic and second classification information of the target book.

In an optional embodiment, the first classification information and the second classification information each have multiple classification levels; and the determining, for any topic, the matching degree between the topic and the target book based on the first classification information of the topic and the second classification information of the target book, includes: determining, for any classification level, a level matching degree between the topic and the target book at the classification level, based on first classification level information of the first classification information at the classification level and second classification level information of the second classification information at the classification level; and determining the matching degree between the topic and the target book based on level matching degrees respectively determined at the multiple classification levels.

In an optional embodiment, the displaying the recommended book and the target recommended topic according to a display manner matching the preset display condition, includes: in response to the preset display condition including the current display interface being an end-of-chapter page of a book being read, sequentially displaying respective target recommended topics on the end-of-chapter page, and displaying respective recommended books matching each target recommended topic under each target recommended topic; or in response to the preset display condition including the current display interface being a book recommendation interface, sequentially displaying respective recommended books on the book recommendation interface, and displaying respective target recommended topics matching each recommended book on the book recommendation interface.

In an optional embodiment, in response to the current display interface being an end-of-chapter page of a book being read, the displaying respective recommended books matching each target recommended topic includes: determining a display order of the respective recommended books based on respective reading popularity corresponding to the respective recommended books under each target recommended topic, and sequentially displaying the respective recommended books according to a determined display order under each target recommended topic.

In an optional embodiment, in response to the current display interface being a book recommendation interface, sequentially displaying respective recommended books on the book recommendation interface includes: determining a display order of the respective recommended books based on book consumption features respectively corresponding to the respective recommended books, in which the book consumption features include a total number of readers and a reading duration; and displaying the respective recommended books on the book recommendation interface, based on the determined display order of the respective recommended books.

In an optional embodiment, displaying the target recommended topic includes: acquiring topic attribute information corresponding to the target recommended topic; generating a recommendation reason for the target recommended topic based on at least one of: (i) the topic attribute information corresponding to the target recommended topic, and (ii) respective first recommended books matching the target recommended topic, in which the recommendation reason is used for establishing an association between the target recommended topic and the respective first recommended books; replacing an original text of the target recommended topic based on a target text corresponding to the recommendation reason for the target recommended topic; and displaying an updated target recommended topic based on the target text.

In an optional embodiment, after displaying the recommended book and the target recommended topic, the method further includes: in response to a first trigger operation on the target recommended topic, determining, from respective topic posts under the target recommended topic, a target topic post related to the recommended books; in response to having multiple target topic posts, displaying a topic post directory corresponding to the target topic posts, and in response to a second trigger operation on any target topic post in the topic post directory, displaying the target topic post; or in response to having one target topic post, displaying the target topic post.

In a second aspect, the embodiments of the present disclosure further provide a topic recommendation apparatus, including: a determination module, configured to, in response to satisfying a preset display condition, determine a target book to be displayed under the preset display condition; an acquisition module, configured to acquire a target recommended topic matching the target book; and a display module, configured to display recommended book and the target recommended topic according to a display manner matching the preset display condition, in which the recommended book at least includes the target book.

In an optional embodiment, the preset display condition includes at least one of the following: the current display interface being an end-of-chapter page of a book being read, and the current display interface being a book recommendation interface; and when in response to satisfying the preset display condition, determining the target book to be displayed under the preset display condition, the determination module is configured to: in response to the current display interface being an end-of-chapter page of a book being read, use the book being read as the target book; or in response to the current display interface being a book recommendation interface, acquire at least one first recommended book, and use the at least one first recommended book as the target book.

In an optional embodiment, the recommended book further includes a second recommended book in response to the current display interface being an end-of-chapter page of a book being read; and the topic recommendation apparatus further includes a processing module, configured to determine the second recommended book matching the target recommended topic based on information of respective recommended books in respective topic posts under the target recommended topic.

In an optional embodiment, when acquiring the target recommended topic matching the target book, the acquisition module is configured to: determine candidate recommended topics whose matching degree with the target book is greater than a set threshold; and sort the candidate recommended topics based on a total number of converted readers corresponding to each of the candidate recommended topics, and determine the target recommended topic from the candidate recommended topics based on a sorting result, in which the total number of converted readers refers to a total number of new users who read books included in the candidate recommended topics after reading the candidate recommended topics.

In an optional embodiment, the acquisition module determines a matching degree between the target book and any topic by the following step: determining, for any topic, a matching degree between the topic and the target book based on first classification information of the topic and second classification information of the target book.

In an optional embodiment, the first classification information and the second classification information each have multiple classification levels; and when determining, for any topic, the matching degree between the topic and the target book based on the first classification information of the topic and the second classification information of the target book, the acquisition module is configured to: determine, for any classification level, a level matching degree between the topic and the target book at the classification level, based on first classification level information of the first classification information at the classification level and second classification level information of the second classification information at the classification level; and determine the matching degree between the topic and the target book based on level matching degrees respectively determined at the multiple classification levels.

In an optional embodiment, when displaying the recommended book and the target recommended topic according to a display manner matching the preset display condition, the display module is configured to: in response to the preset display condition including the current display interface being an end-of-chapter page of a book being read, sequentially display respective target recommended topics on the end-of-chapter page, and display respective recommended books matching each target recommended topic under each target recommended topic; or in response to the preset display condition including the current display interface being a book recommendation interface, sequentially display respective recommended books on the book recommendation interface, and display respective target recommended topics matching each recommended book on the book recommendation interface.

In an optional embodiment, in response to the current display interface being an end-of-chapter page of a book being read, when displaying respective recommended books matching each target recommended topic, the display module is configured to: determine a display order of the respective recommended books based on respective reading popularity corresponding to the respective recommended books under each target recommended topic, and sequentially display the respective recommended books according to a determined display order under each target recommended topic.

In an optional embodiment, in response to the current display interface being a book recommendation interface, when sequentially displaying respective recommended books on the book recommendation interface, the display module is configured to: determine a display order of the respective recommended books based on book consumption features respectively corresponding to the respective recommended books, in which the book consumption features include a total number of readers and a reading duration; and display the respective recommended books on the book recommendation interface, based on the determined display order of the respective recommended books.

In an optional embodiment, when displaying the target recommended topic, the display module is configured to: acquire topic attribute information corresponding to the target recommended topic; generate a recommendation reason for the target recommended topic based on at least one of: (i) the topic attribute information corresponding to the target recommended topic, and (ii) respective first recommended books matching the target recommended topic, in which the recommendation reason is used for establishing an association between the target recommended topic and the respective first recommended books; replace an original text of the target recommended topic based on a target text corresponding to the recommendation reason for the target recommended topic; and display an updated target recommended topic based on the target text.

In an optional embodiment, after displaying the recommended book and the target recommended topic, the display module is further configured to: in response to a first trigger operation on the target recommended topic, determine, from respective topic posts under the target recommended topic, a target topic post related to the recommended book; in response to having multiple target topic posts, display a topic post directory corresponding to the target topic posts, and in response to a second trigger operation on any target topic post in the topic post directory, display the target topic post; or in response to having one target topic post, display the target topic post.

In a third aspect, the embodiments of the present disclosure further provide a computer device, including a processor and a memory; the memory stores machine-readable instructions executable by the processor, the processor is configured to execute the machine-readable instructions stored in the memory, and when the machine-readable instructions are executed by the processor, the processor performs the topic recommendation method according to the first aspect or any optional embodiment in the first aspect.

In a fourth aspect, the embodiments of the present disclosure further provide a computer-readable storage medium storing a computer program, and when the computer program is executed by a computer device, the computer device performs the topic recommendation method according to the first aspect or any optional embodiment in the first aspect.

The embodiments of the present disclosure provide a topic recommendation method and apparatus, a computer device, and a storage medium. In order to satisfy the recommendation needs in different reading scenarios, a book of interest to the user, i.e., a corresponding target book to be displayed under different display conditions, may be determined first. By means of the target book, a target recommended topic matching the target book may be acquired such that the target recommended topic and recommended books including the target book may be displayed under different display conditions. In this way, the user may directly acquire other books of interest from the displayed recommended books and the target recommended topic in addition to the determined book of interest, thereby improving the efficiency of finding books of interest.

To make the objectives, features, and advantages of the present disclosure more apparent and understandable, preferred embodiments are described in detail below in conjunction with the drawings.

BRIEF DESCRIPTION OF DRAWINGS

In order to more clearly illustrate the technical solutions of the embodiments of the present disclosure, the drawings required for the embodiments are briefly described below. These drawings are incorporated into and constitute a part of the present disclosure. These drawings illustrate embodiments that comply with the present disclosure and, together with the detailed description, serve to explain the technical solutions of the present disclosure. It should be understood that the following drawings only show some embodiments of the present disclosure and therefore should not be considered as limiting its scope. For those skilled in the art, other related drawings may also be obtained based on these drawings without any creative effort.

DETAILED DESCRIPTION

Figure 1:
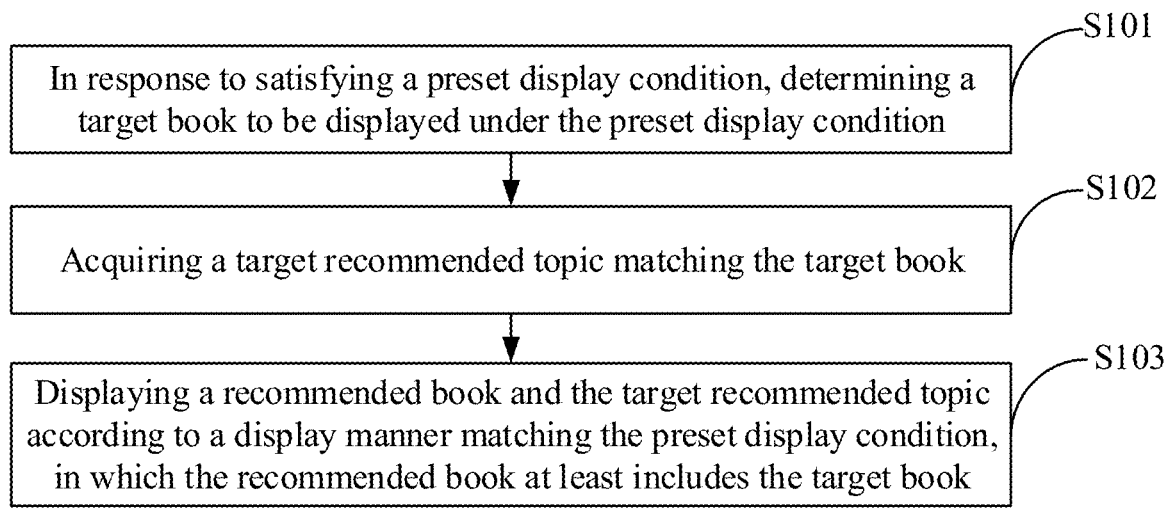
FIG. 1 illustrates a flowchart of a topic recommendation method according to the embodiments of the present disclosure.

In order to make the objectives, technical solutions, and advantages of the embodiments of the present disclosure clearer, the technical solutions in the embodiments of the present disclosure will be described clearly and completely below in conjunction with the drawings. Apparently, the described embodiments are just a part but not all of the embodiments of the present disclosure. The components of the embodiments of the present disclosure typically described and illustrated herein can be arranged and designed in a variety of different configurations. Therefore, the detailed description of the embodiments of the present disclosure provided below is not intended to limit the scope of the present disclosure as claimed, but merely represents selected embodiments of the present disclosure. All other embodiments obtained by those skilled in the art without any creative effort based on the embodiments of the present disclosure fall within the scope of the present disclosure.

It has been found that when a user selects a book that he/she is interested in reading, the user also has a need to find other books he/she is interested in. Because only books that the user is interested in will be displayed in a targeted manner in various different reading scenarios, and other books or related contents will not be displayed, the user may only preview more introductions of books or preview the contents in order to find other books of interest, which leads to a low efficiency in finding books of interest.

Based on the above-mentioned research, the present disclosure provides a topic recommendation method. In order to satisfy the recommendation needs in different reading scenarios, a book of interest to the user, i.e., a corresponding target book to be displayed under different display conditions, may be determined first. By means of the target book, a target recommended topic matching the target book may be acquired such that the target recommended topic and recommended books including the target book may be displayed under different display conditions. In this way, the user may directly acquire other books of interest from the displayed recommended books and the target recommended topic in addition to the determined book of interest, thereby improving the efficiency of finding books of interest.

The defects of the above-mentioned solution are the result of the inventor's practice and careful study, and therefore, the process of discovering the above-mentioned problem and the solution proposed in the present disclosure below to address the above-mentioned problem should be the inventor's contribution to the present disclosure in the course of the present disclosure.

It should be noted that similar signs and letters denote similar items in the following drawings, and therefore, once an item is defined in a figure, it does not need to be further defined or explained in the subsequent figures.

In order to facilitate the understanding of the present disclosure, a topic recommendation method disclosed in the embodiments of the present disclosure is first described in detail. The topic recommendation method provided in the embodiments of the present disclosure is generally executed by a computer device having certain computing power. The computer device includes, for example, a terminal device or a server or other processing devices, and the terminal device may be UE (User Equipment), a mobile device, a user terminal, a terminal, a cellular phone, a cordless phone, a PDA (Personal Digital Assistant), a handheld device, a computing device, an in-vehicle device, a wearable device, and the like. In some optional implementations, the topic recommendation method may be implemented by way of a processor calling computer-readable instructions stored in a memory.

The topic recommendation method provided in the embodiments of the present disclosure is described below.

Referring to FIG. 1, a flowchart of a topic recommendation method according to the embodiments of the present disclosure is illustrated. The method includes steps S101-S103 as follows:

S101: in response to satisfying a preset display condition, determining a target book to be displayed under the preset display condition;

S102: acquiring a target recommended topic matching the target book; and

S103: displaying a recommended book and the target recommended topic according to a display manner matching the preset display condition, in which the recommended book at least includes the target book.

The following describes the steps S101-S103 in detail.

With respect to the step S101, in a specific implementation, the preset display condition includes at least one of the following: the current display interface being an end-of-chapter page of a book being read, and the current display interface being a book recommendation interface.

Figure 2:
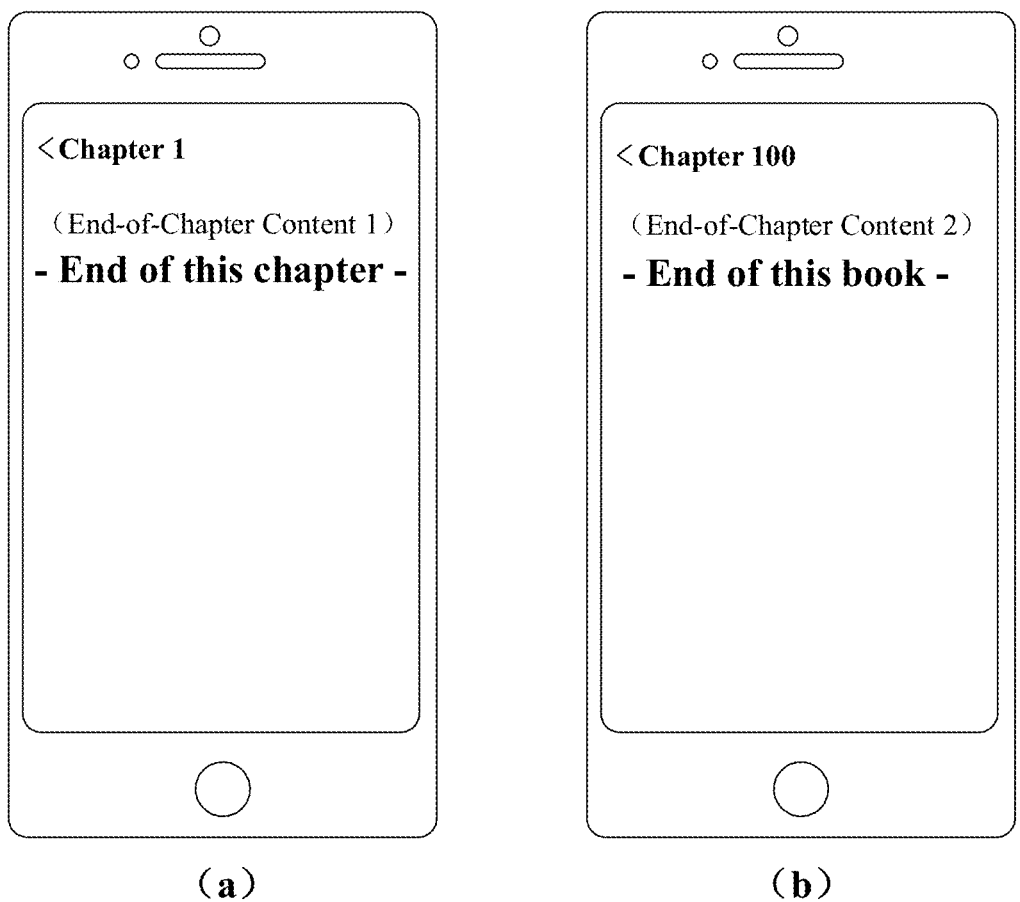
FIG. 2 illustrates a schematic diagram of an end-of-chapter page of a book according to the embodiments of the present disclosure.

The case of the current display interface being an end-of-chapter page of a book being read is described first. Illustratively, referring to FIG. 2, a schematic diagram of an end-of-chapter page of a book according to the embodiments of the present disclosure is illustrated. Specifically, the user may read chapters of a book in response to a page-turning operation on a displayed reading page when reading the book. When it is determined that the last reading page corresponding to any chapter is displayed, it is determined that the preset display condition is satisfied, i.e., the current display interface is an end-of-chapter page of the book. Because the end-of-chapter page of the book may include an end page of another chapter in the book except the last chapter, or may include an end page of the last chapter in the book, i.e., an updated end page of the book, two different cases are illustrated in FIG. 2 in two schematic diagrams (a) and (b).

Under this preset display condition, in the process of determining a target book to be displayed under the preset display condition, a book being read may be determined as the target book. Because the target book is a book that the user is reading, or has finished reading, it may be assumed that the user is more interested in the content related to the book. Therefore, the target recommended topic, acquired in the subsequent step, matching the target book will be closer to the topics that the user is interested in, which accordingly improves the efficiency of finding other books using the displayed topics.

Figure 3:
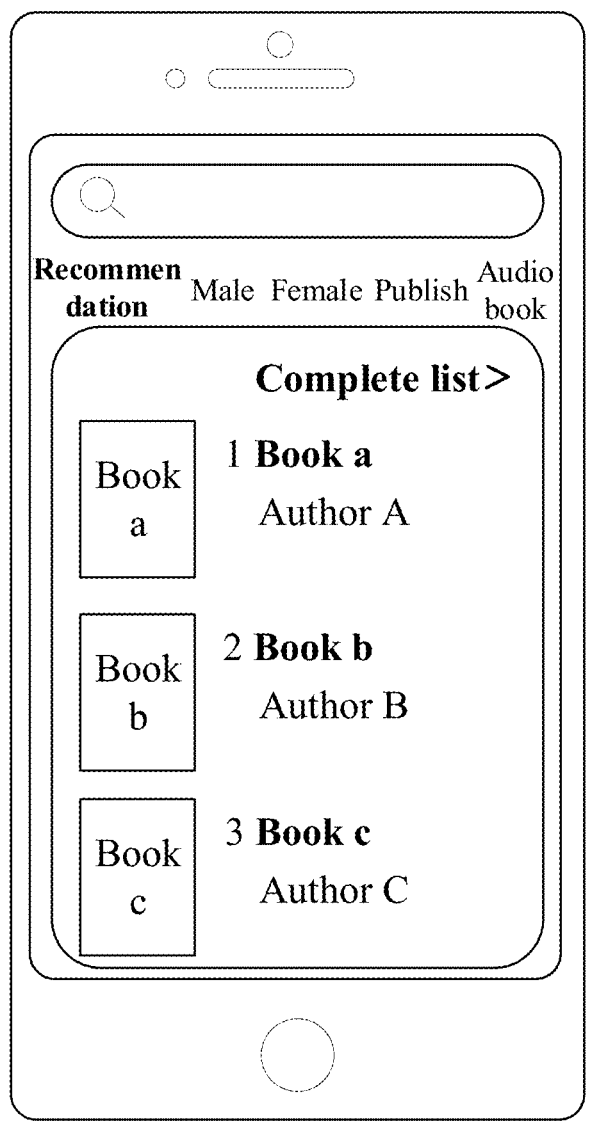
FIG. 3 illustrates a schematic diagram of a book recommendation interface according to the embodiments of the present disclosure.

The case of the current display interface being a book recommendation interface is described next. Illustratively, referring to FIG. 3, a schematic diagram of a book recommendation interface according to the embodiments of the present disclosure is illustrated. Some of recommended books are illustrated in the schematic diagram, and information such as the cover, title, and author of each book is specifically illustrated. In addition, the book recommendation interface is further configured with a trigger button for viewing a complete list, and in response to a trigger operation on the trigger button, a list of all recommended books may be displayed.

The book recommendation interface displays a plurality of recommended books. The displayed recommended books in the embodiments of the present disclosure are referred to as first recommended books. The first recommended books each may be a book that is close to the user's reading preference determined using historical reading data obtained based on user authorization, or may be a predetermined recommended book, such as a book that is currently hotly promoted by other users or a hotly promoted book on the platform. Specifically, in response to a trigger operation on the recommendation interface, it is determined that the book recommendation interface that may be displayed satisfies the preset display condition.

In such a case, in the process of determining a target book to be displayed under the preset display condition, at least one first recommended book on the book recommendation interface may be acquired, and the at least one first recommended book may be used as the target book. In such a case, because the target book is close to the reading preference of the user or is a hotly promoted book on the platform, the target recommended topic acquired in the subsequent step that matches the target book may also be close to the topics that the user is interested in or includes topics that the platform intends to recommend to the user for display.

With respect to the step S102, in response to that the target book to be displayed under the preset display condition is determined, the target recommended topic matching the target book may also be acquired to expand the display of the target book in the form of topics on the basis of displaying the target book.

In a specific implementation, the target recommended topic matching the target book may be acquired by the following: determining candidate recommended topics whose matching degree with the target book is greater than a set threshold; sorting the candidate recommended topics based on a total number of converted readers corresponding to each of the candidate recommended topics, and determining the target recommended topic from the candidate recommended topics based on a sorting result; and the total number of converted readers refers to a total number of new users who read books included in the candidate recommended topics after reading the candidate recommended topics.

Specifically, with the target book determined, multiple topics may be determined on an e-reading platform, and the target recommended topic matching the target book may be determined therefrom for display. Because the number of topics matching the target book on the e-reading platform may be large, a matching degree between the target book and each topic may be determined first, and then some of recommended topics may be screened out from respective topics according to the set threshold as candidate recommended topics.

For example, the matching degree between the target book and any topic may be determined by the following: determining, for any topic, a matching degree between the topic and the target book based on first classification information of the topic and second classification information of the target book.

Illustratively, the topics and the target book may be classified in the same or similar manner, and thus the topics and the target book specifically may have the same or similar classification information. For example, book genres corresponding to books discussed under the topic is used as the first classification information of the topic, and a book genre corresponding to the target book is used as the second classification information. The book genre is, for example, novel, poem, autobiography, or essay. If the book genre of the target book is the novel, and there is a certain topic, under which a book corresponding to the book genre discussed is the novel, then the topic may be considered to have a high matching degree with the target book.

In a possible case, if only one dimension under classification is used to classify the topics and the target book, there may be more topics that may be matching the target book due to a broad classification benchmark, which has a poor screening effect, and the screened topics do not necessarily have a better association with the target book in the content under the classification. Therefore, in the process of determining the classification information, multiple classification levels may also be determined, such as the novel and poem as a first classification level. For novel in the first classification level, science novel, romantic novel, and metaphysical novel are determined as a corresponding second classification level. For poem in the first classification level, contemporary poem and modern poem are determined as a corresponding second classification level, and the like. The greater the number of genres divided in each classification level, the more detailed the classification of the target book and topics will be. In this way, as compared to the way of determining the classification information using only the book genres such as novel and poem, etc. in the above-mentioned example, the way of determining the classification information using multiple classification levels is more detailed, and the matching degree determined is more reflective of whether the content involved in the topic may be more compatible with the content of the target book at the multiple different classification levels.

In a specific implementation, it is possible to determine, for any classification level, a level matching degree between the topic and the target book at the classification level, based on first classification level information of the first classification information at the classification level and second classification level information of the second classification information at the classification level; and to determine the matching degree between the topic and the target book based on level matching degrees respectively determined at the multiple classification levels.

In a possible case, if the multiple classification levels have an inclusion relationship therebetween, and each classification level has mutually exclusive genres, respectively, it may be determined one by one at the classification level whether the first classification level information of the topic and the second classification level information of the target book consistent or not, so as to determine the level matching degree of the topic and the target book at each classification level.

Illustratively, if there are two classification levels, including a first classification level and a second classification level, and the first classification level has two mutually exclusive genres, including novel and poem; and the second classification level of the poem at the first classification level also has two mutually exclusive genres, including modern poem and contemporary poem.

Several possible example scenarios are listed below for illustration, respectively.

Example scenario 1: in the first classification level, if the first classification level information of the first classification information of the topic at the classification level refers to novel, and the second classification level information of the second classification information of the target book at the classification level refers to poem, the two are classified as two mutually exclusive genres, and accordingly it may be determined that the level matching degree between the topic and the target book at that classification level is low. In this case, because the next classification level is determined based on that classification level and is a further subdivision of the classification, there is no need to determine the level matching degree for the next classification level if the level matching degree is determined to be low at that classification level. And it is determined that the topic has a low matching degree with the target book. The matching degree between the topic and the target book may be indicated with a numerical value, for example, it may be set as a value of 0.

Example Scenario 2: in the first classification level, if the first classification level information of the first classification information of the topic at the classification level and the second classification level information of the second classification information of the target book at the classification level both refer to poem, it may be determined that the topic and the target book have a high-level matching degree at that classification level. However, because the way of classification at a high classification level is broader, the level matching degree of the classification level may be indicated with a numerical value, for example, it may be set as 1, meaning that the topic is matched with the target book at least at that classification level.

As for the second classification level, if in the second classification level, the first classification level information of the first classification information of the topic at the second classification level refers to modern poetry, while the second classification level information of the second classification information of the target book at the second classification level refers to contemporary poetry, then the two belong to two mutually exclusive genres respectively in the second classification level. In this case, the level matching degree of 1 that is determined in the first classification level may be retained; and because the first classification level has broad way of classification, the matching degree between the topic and the target book may be determined by means of weighting. For example, by setting a weight value of the level matching degree corresponding to the first classification level to be 0.5, the level matching degree of 1 of the first classification will be calculated based on the weight value of 0.5, so as to obtain a matching degree of 0.5 between the topic and the target book Example Scenario 3: in the first classification level, the level matching degree between the topic and the target book at the classification level as in the above-mentioned Example scenario 2 is continued. Moreover, in the second classification level, the first classification level information of the first classification information of the topic at the second classification level and the second classification level information of the second classification information of the target book at the second classification level both refer to contemporary poetry. In this case, it is determined that the topic and the target book have the same subdivision of classification at the second classification level, and accordingly it may be determined that the topic also has a high-level matching degree with the target book at the second classification level. For example, it is determined that the level matching degree between the topic and the target book at the second classification level is 1.

Similar to the above-mentioned Example scenario 2, a weight value of the level matching degree may be set for the second classification level, for example, as 0.2. Therefore, with the weight value of 0.5 set for the first classification level and the weight value of 0.2 set for the second classification level, the matching degree between the topic and the target book may be calculated to be 0.7.

In another possible case, multiple-choice genres may also be included in the classification level. For example, if the first classification level includes the genre of novel, the second classification level under the genre of novel may include genres of romance, time-travel, ancient style, conflict, and the like. Illustratively, if the first classification level information of the first classification information of the topic at the second classification level includes romance, time-travel, and ancient style, and the second classification level information of the second classification information of the target book at the second classification level includes romance, ancient style, and conflict, then at least two genres of romance and ancient style are matched, and it is considered that the topic has a high level matching degree with the target book at the second classification level. If the first classification level information of the first classification information of the topic at the second classification level includes only time-travel, it cannot be matched with any genre of the second classification level information, and accordingly, it is considered that the topic has a low-level matching degree with the target book at the second classification level.

In this way, with the level matching degree between the topic and the target book at multiple classification levels, the obtained matching degree between the topic and the target book may be more accurate.

The above-mentioned process of acquiring a target recommended topic matching the target book is continued. After the matching degree between each topic and the target book is determined, the candidate recommended topics may be determined from respective topics based on the set threshold. Here, the set threshold may be artificially prescribed, such as set as 0.75 or 0.8, to acquire a sufficient number of candidate recommended topics. Alternatively, it may be dynamically adjusted according to the actual situations. For example, if there are currently more topics that may be determined, and there are a large proportion of topics among the respective topics that have a matching degree which is greater than 0.8 with the target book, then the set threshold may be dynamically increased, for example, increased to 0.85, in order to screen out an appropriate number of candidate recommended topics.

After the candidate recommended topics are determined, it is also possible to sort the candidate recommended topics based on the number of converted readers corresponding to each of the candidate recommended topics, and determine the target recommended topic from the candidate recommended topics based on a sorting result. The number of converted readers refers to the number of new users who read books included in the candidate recommended topics after reading the candidate recommended topics.

Specifically, based on the number of converted readers corresponding to each of the candidate recommended topics, multiple candidate recommended topics may be sequentially sorted in accordance with the order of the number from the largest to the smallest, and the target recommended topic for display is determined based on the sorting result. In a possible case, if the current display interface is an end-of-chapter page of a book being read, and the target book currently displayed includes only the book being read, then multiple target recommended topics may be selected, such as two or three target recommended topics may be selected, to enrich the display content displayed to the user. In another possible case, if the current display interface is a book recommendation interface, and the currently displayed target books may include a plurality of first recommended books, in order to avoid excessive dispersed displaying information, one or two target recommended topics may be determined for each first recommended book.

With respect to the step S103, in response to the target recommended topic being determined, the target recommended topic and the recommended books may be displayed. The recommended books include at least the target book. Illustratively, in response to the current display interface being an end-of-chapter page of a book being read, the displayed recommended book may include the book being read as the target book. In response to the current display interface being a book recommendation interface, the displayed recommended book may include at least one first recommended book as the target book.

Under different preset display conditions, the recommended books and the target recommended topic may be specifically displayed according to a display manner matching the preset display condition. The following describes two different cases in which the preset display condition is that the current display interface is an end-of-chapter page of a book being read and that the current display interface is a book recommendation interface, respectively.

First, in response to the preset display condition including the current display interface being an end-of-chapter page, in the displaying of the recommended books and the target recommended topic according to a display manner matching the preset display condition, the respective target recommended topics may be displayed sequentially on the end-of-chapter page, and under each target recommended topic, the respective recommended books matching each target recommended topic are displayed.

The recommended books matching the target recommended topic include the book being read as the target book. The book being read may be displayed directly on a reading interface. The recommended books matching the target recommended topic may further include another book discussed under the target recommended topic, which may be, for example, acquired from the target recommended topic. Specifically, it is possible to determine a second recommended book matching the target recommended topic based on information of the respective recommended books in respective topic posts under the target recommended topic.

Here, the topic posts under the target recommended topic are created about the target recommended topic, which may enable different users to discuss and communicate about the books therein. Therefore, in a topic post, for example, information about the books discussed and communicated by the users under the target recommended topic, such as information indicating titles and the related authors of the books, may be determined in the name of the topic post and the comment message, so as to determine the related books as the second recommended books, and display the second recommended books in association under the target recommended topic.

Illustratively, in the process of displaying on the end-of-chapter page, if the target book is "Book A", i.e., the book that the user is currently reading, then "Book A" is continued to be displayed on the reading interface. A target recommended topic matching the target book includes Topic 1, and books including "Book B", "Book C", and "Book D" may be acquired under the target recommended topic. The "Book B", "Book C", and "Book D" are displayed as the recommended books under the target recommended topic.

Here, because the number of books acquired under the target recommended topic is not limited, in a possible case, a predetermined number of recommended books may be determined from all the obtainable books according to the reading popularity as illustrated below. For example, if it is determined that only four recommended books may be displayed under one target recommended topic, then four books are selected for display according to the reading popularity. Alternatively, in another possible case, if fewer books may be acquired, such as only three or four books may be acquired, then all the acquired books may be displayed as the recommended books.

Specifically, in the process of displaying the respective recommended books matching the target recommended topic, it is possible to determine a display order of the respective recommended books based on respective reading popularity corresponding to the respective recommended books under the target recommended topic, and to sequentially display the respective recommended books according to a determined display order under the target recommended topic.

Here, the reading popularity corresponding to a recommended book may, for example, indicate the number of times the recommended book has been read in a recent period of time, or the number of people who have read the recommended book. With the reading popularity, the books acquired may be screened, the determined recommended books may also be sorted, so that the recommended books with higher reading popularity may be displayed forward under the target recommended topic.

Figure 4:
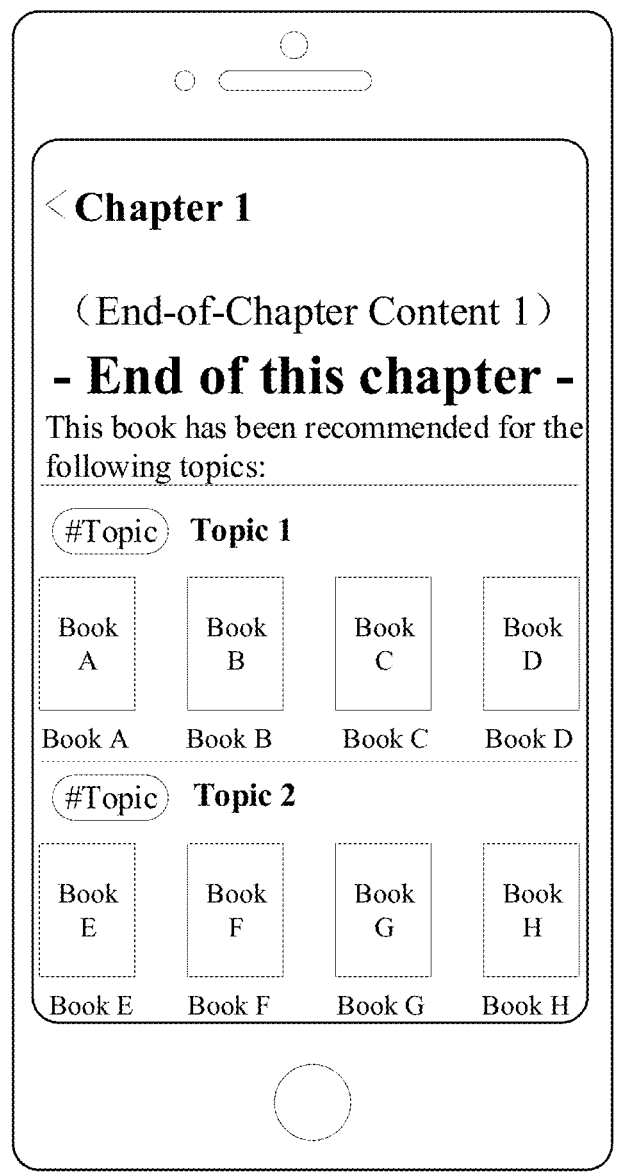
FIG. 4 illustrates a schematic diagram of displaying recommended books and target recommended topics on an end-of-chapter page of a book being read according to the embodiments of the present disclosure.

Illustratively, referring to FIG. 4, a schematic diagram of displaying recommended books and target recommended topics on an end-of-chapter page of a book being read according to the embodiments of the present disclosure is illustrated. On the basis of the end-of-chapter page illustrated in (a) of FIG. 2, two target recommended topics corresponding to the target book, including Topic 1 and Topic 2, are displayed by a guide word "This book has been recommended with the following topics". Under each target recommended topic, a plurality of recommended books sorted in a determined manner are also included, which are displayed in a specific manner by displaying covers and titles of the books. Here, in response to a trigger operation on a target recommended topic, the current interface may jump to a topic post corresponding to the target recommended topic for display, which may specifically refer to the description in the corresponding section below, and will not be repeated here. In addition, in response to a trigger operation on a cover or title of a recommended book, the current interface may also jump to a reading interface of the recommended book for display, and a reading service of the recommended book is provided to the user.

Second, in response to that the preset display condition includes the current display interface being a book recommendation interface, in the displaying of the recommended book and the target recommended topic according to a display manner matching the preset display condition, the respective recommended books and respective recommended topics matching each recommended book may be displayed sequentially on the book recommendation interface.

The recommended books matching the target recommended topic include the target books, i.e., including the first recommended books described above. Because the recommended books are displayed on the book recommendation interface, the recommended books may be displayed in terms of introductory information such as titles, authors and covers. In response to a large number of recommended books, the recommended books may be arranged and displayed on the book recommendation interface. Illustratively, the recommended books include, for example, "Book a", "Book b", and "Book c".

Here, in the process of sequentially displaying the respective recommended books on the book recommendation interface, it is possible to determine a display order of the respective recommended books based on book consumption features respectively corresponding to the respective recommended books, where the book consumption features include the number of readers and the reading duration; and to display the respective recommended books on the book recommendation interface, based on the determined display order of the respective recommended books.

In a possible case, in the process of determining the book consumption features of any recommended book, for example, the corresponding book consumption features may be determined based on the number of readers and the reading duration of the book according to a preset scoring rule. For example, for the book consumption features of the number of readers, it is determined that the corresponding score is 10 points when the number of readers is 0-5, 20 points when the number of readers is 6-10, and the like. For the book consumption features of the reading duration, it is determined that the corresponding score is 10 points when the reading duration is 0-10 hours, 20 points when the reading duration is 10-20 hours, and the like. In this way, the book consumption features of the recommended book may be quantitatively measured in the form of scores, bringing more convenience to determining the display order of the respective recommended books according to the book consumption features. For example, the display order may be determined in accordance with the scores from highest to lowest.

Here, one possible specific implementation of determining the book consumption features for the recommended books is provided. If there are other optional ways, they are all within the protection scope of the embodiments of the present disclosure, and the way of determining the book consumption features is not limited herein.

For the recommended books, there are corresponding target recommended topics. When displaying the recommended books, the corresponding target recommended topics may be displayed. Illustratively, for the recommended books determined in the above-mentioned examples, the target recommended topic corresponding to "Book a" among the recommended books may be determined as Topic 1, the target recommended topic corresponding to "Book b" as Topic 2, and the target recommended topic corresponding to "Book c" as Topic 3.

Figure 5:
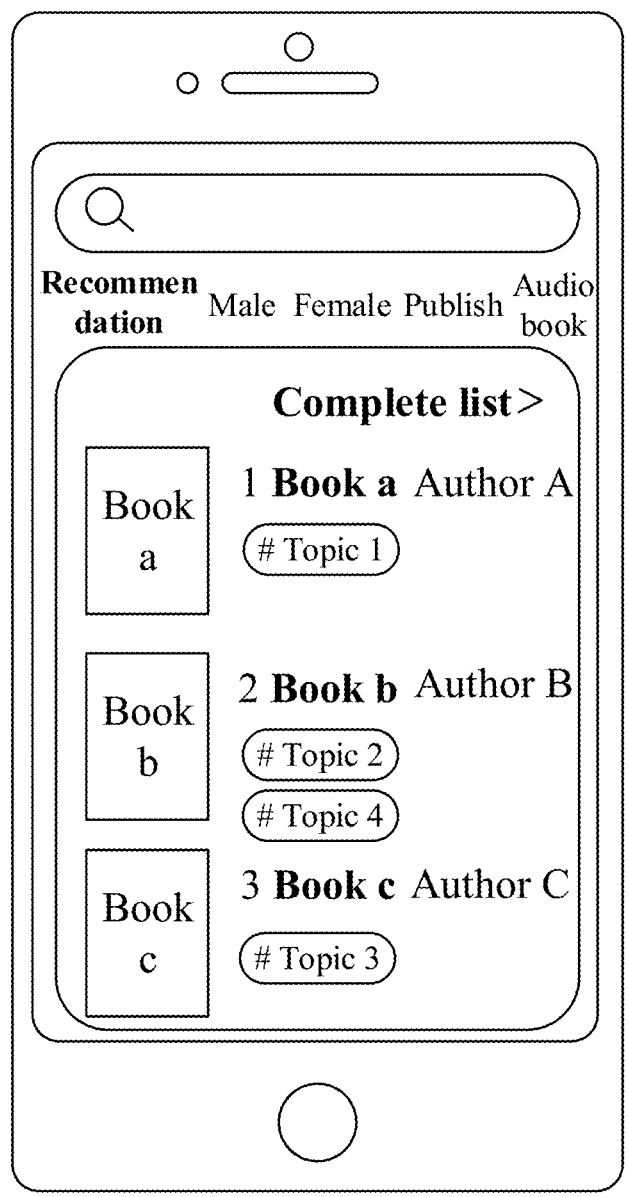
FIG. 5 illustrates a schematic diagram of displaying recommended books and target recommended topics on a book recommendation interface according to the embodiments of the present disclosure.

Illustratively, referring to FIG. 5, a schematic diagram of displaying recommended books and target recommended topics on a book recommendation interface according to the embodiments of the present disclosure is illustrated. Compared with the book recommendation interface illustrated in FIG. 3, the target recommended topic corresponding to the recommended topic is displayed at an associated position of each recommended book. Here, each recommended book may have multiple target recommended topics, for example, the target recommended topics corresponding to "Book b" in the schematic diagram include Topic 2 and Topic 4. In addition, similar to FIG. 4 above, in response to a trigger operation on a cover or title of a recommended book, the current interface may jump to a reading interface of the recommended book for display; and in response to a trigger operation on a target recommended topic, the current interface may jump to a topic post corresponding to the target recommended topic for display.

In another embodiment of the present disclosure, the name of the target recommended topic may be updated and displayed. The updated name of the target recommended topic may reflect an association between the target recommended topic and the recommended book, and may be used as a recommendation reason to attract users to trigger a view.

Illustratively, the current display interface being an end-of-chapter page of a book being read is taken as an example. Because the target recommended topic is specifically determined, for example, by classification information, the content of the target recommended topic under the classification information is associated with a first recommended book. However, in the process of displaying the target recommended topic, specifically, the original name of the target recommended topic may be displayed, for example, the name determined by the user when creating the target recommended topic, and the original name of the target recommended topic may not be able to better reflect the association with the first recommended book, nor may it reflect the reason for displaying the target recommended topic, and therefore, it is not possible to make an effective recommendation by displaying the name of the target recommended topic.

Therefore, before the target recommended topic is displayed, a recommendation reason for the associated target recommended topic may be generated based on the topic attribute information about the target recommended topic or the matched first recommended books. Here, the generated recommendation reason may be used for replacing the name of the target recommended topic and displayed, or the determined recommendation reason may be displayed in association on the basis of displaying the original name of the target recommended topic, so as to make a recommendation for the target recommended topic.

In a specific implementation, in the process of displaying the target recommended topic, it is specifically possible to acquire topic attribute information corresponding to the target recommended topic; generate a recommendation reason for the target recommended topic based on at least one of: (i) the topic attribute information corresponding to the target recommended topic, and (ii) respective first recommended books matching the target recommended topic, where the recommendation reason is used for establishing an association between the target recommended topic and the respective first recommended books; replace an original text of the target recommended topic based on a target text corresponding to the recommendation reason for the target recommended topic; and display the recommendation reason for the updated target recommended topic based on the target text.

The topic attribute information includes at least one of the following: a statistical number of respective topic posts under the target recommended topic, topic titles corresponding to the respective topic posts, and comment information corresponding to the respective topic posts. In the process of generating the recommendation reason for the target recommended topic based on at least one of: (i) the topic attribute information corresponding to the target recommended topic, and (ii) the respective first recommended books matching the target recommended topic, for example, the content associated with the first recommended books may be determined therefrom, and then the recommendation reason may be determined.

Illustratively, taking the case that the first recommended book is "Book a" as an example, for example, the original text of a corresponding target recommended topic is "Request recommendation of good novels", which cannot provide an effective recommendation for users to view the target recommended topic to acquire information related to the first recommended book. Here, for example, according to the determined statistical number of respective topic posts under the target recommended topic and topic titles corresponding to the respective topic posts, it is determined that the topic titles corresponding to the topic posts having a high proportion under the target recommended topic have contents related to the recommended books, for example, the titles, authors' names, protagonists' names, etc. of the recommended books involved in the topic titles of a large number of topic posts, and accordingly, it is possible to determine a recommendation reason for the target recommended topic is "Book a is hotly discussed in the topic".

After the recommendation reason for the target recommended topic is determined, "Book a is hotly discussed in the topic" may be used a target text, and the target text is used to replace the original text of the target recommended topic and updated for display. In this way, in the process of displaying the target recommended topic, the association between the target recommended topic and the first recommended book may be more intuitively displayed through the target text.

Figure 6:
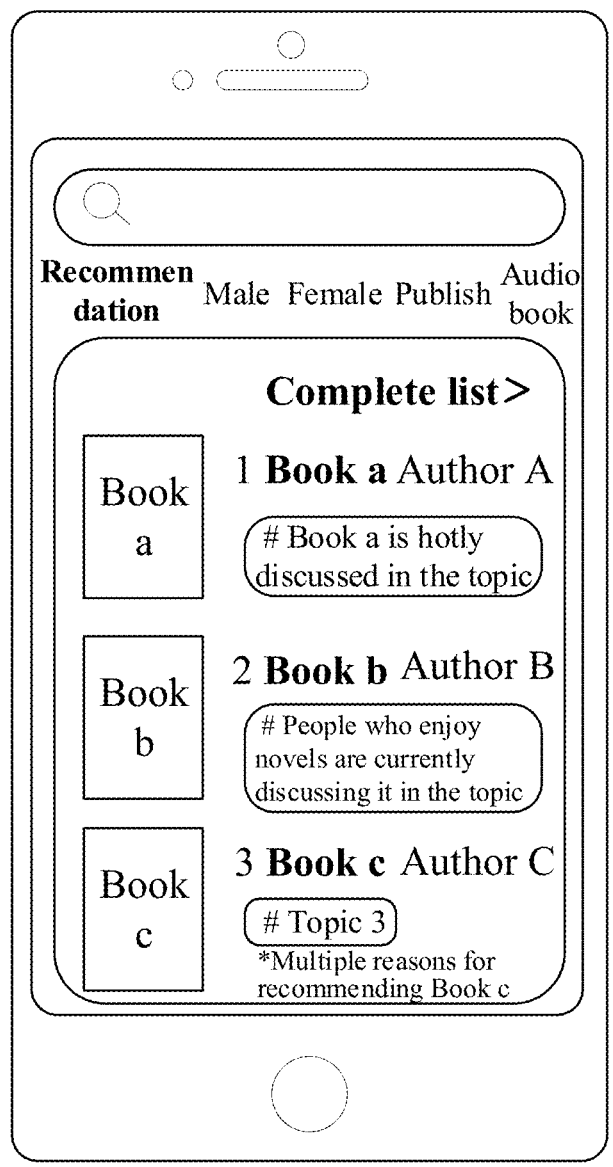
FIG. 6 illustrates another schematic diagram of displaying recommended books and target recommended topics on the book recommendation interface according to the embodiments of the present disclosure.

Illustratively, referring to FIG. 6, another schematic diagram of displaying recommended books and target recommended topics on the book recommendation interface according to the embodiments of the present disclosure is illustrated. Compared with the book recommendation interface illustrated in FIG. 5, the target recommended topics for Book a and Book b are displayed with the updated target text. For Book c, the target text displayed in the form of a recommendation reason is also displayed, and the target recommended topic is labeled with "*" to distinguish it from other target recommended topics displayed with the target text as the display content.

Furthermore, in another embodiment of the present disclosure, after the recommended books and the target recommended topics are displayed, a topic post under a target recommended topic may be displayed in response to a trigger operation on the target recommended topic. In a possible case, because the topic posts under the target recommended topic may include a topic post not related to the recommended book, a target topic post related to the recommended book may be determined from respective topic posts under the target recommended topic in response to the first trigger operation for the target recommended topic, and the target topic post related to the recommended book may be displayed.

In a possible case, in response to multiple target topic posts being determined, a topic post directory corresponding to the target topic posts may be displayed. In this way, the multiple target topic posts may be displayed in an orderly manner by means of the topic post directory. In response to a second trigger operation on any target topic post in the topic post directory, the target topic post may then be displayed, whereupon the user may then view comments or discuss and communicate with other users in the target topic post to acquire new books of interest. In another possible case, in response to one target topic post being determined, the target topic post may be displayed directly.

Figure 7:
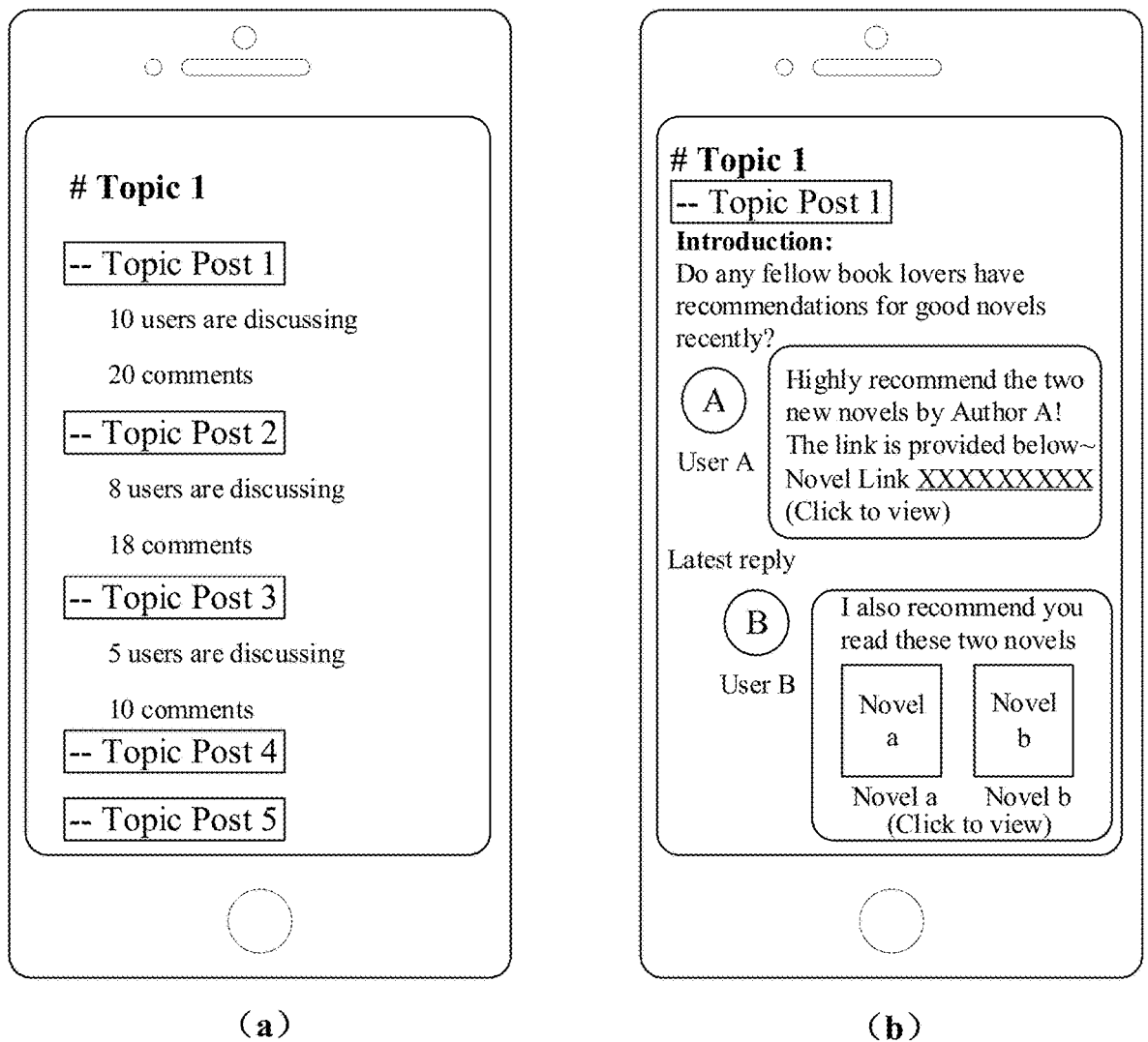
FIG. 7 illustrates a schematic diagram of displaying target topic posts according to the embodiments of the present disclosure.

Illustratively, referring to FIG. 7, a schematic diagram of displaying target topic posts according to the embodiments of the present disclosure is illustrated. The (a) in FIG. 7 illustrates a schematic diagram of a topic post directory displayed in response to multiple target topic posts being determined. In the schematic diagram, the topic post directory consisting of a plurality of target topic posts under a target recommended topic "Topic 1" is illustrated. Under each target topic post, the number of users currently participating in the target topic post and the number of comments may also be displayed for reference. The (b) in FIG. 7 illustrates a target topic post displayed by a second trigger operation on any target topic post from the (a) in FIG. 7, or an example diagram of directly displaying a target topic post in response to having only one target topic post. Specifically, an introduction of the target topic post, user information corresponding to a user who has participated in the topic discussion (e.g., a user avatar, a user name, and a user identifier), and discussion content sent by the user to be displayed may be illustrated. In addition, in the discussion content, information such as the reading link, cover, and the like related to the book may also be included specifically, which may be determined according to the actual situations. FIG. 7 only provides an implementable example and does not impose any limitations.

Those skilled in the art may understand that, in the specific implementation of the above-mentioned methods, the writing order of the steps does not imply a strict order of execution and does not constitute any limitation of the implementation process, and the specific execution order of the steps should be determined by its function and possible internal logic.

Based on the same inventive concept, the embodiments of the present disclosure further provide a topic recommendation apparatus corresponding to the topic recommendation method. Because the apparatus in the embodiments of the present disclosure solves the problem in a similar way to the topic recommendation method in the embodiments of the present disclosure, the implementation of the apparatus may refer to the implementation of the method, and repeated descriptions are omitted.

Figure 8:
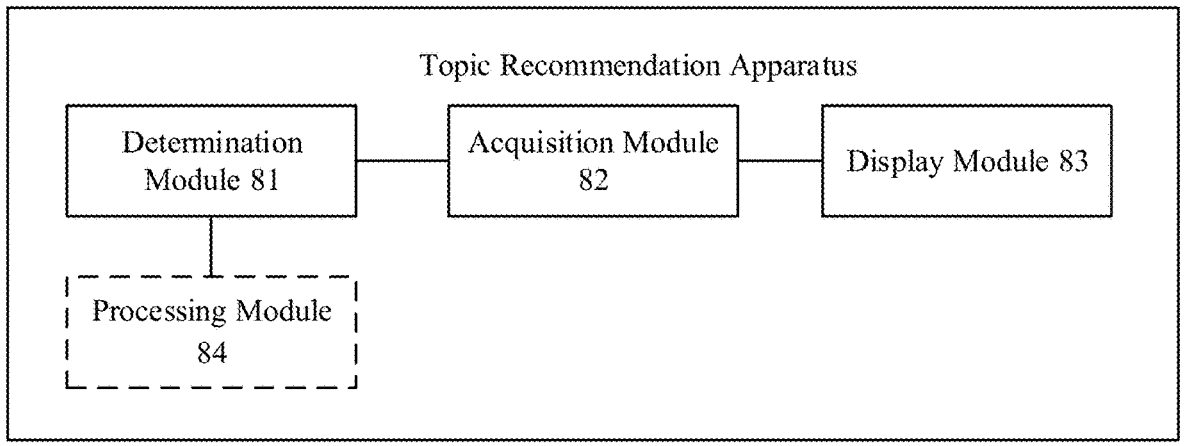
FIG. 8 illustrates a schematic diagram of a topic recommendation apparatus according to the embodiments of the present disclosure.

Referring to FIG. 8, a schematic diagram of a topic recommendation apparatus according to the embodiments of the present disclosure is illustrated. The apparatus includes a determination module 81, an acquisition module 82, and a display module 83.

The determination module 81 is configured to, in response to satisfying a preset display condition, determine a target book to be displayed under the preset display condition.

The acquisition module 82 is configured to acquire a target recommended topic matching the target book.

The display module 83 is configured to display a recommended book and the target recommended topic according to a display manner matching the preset display condition, wherein the recommended book at least comprises the target book.

In an optional embodiment, the preset display condition includes at least one of the following: the current display interface being an end-of-chapter page of a book being read, and the current display interface being a book recommendation interface; and when in response to satisfying the preset display condition, determining the target book to be displayed under the preset display condition, the determination module 81 is configured to: in response to the current display interface being an end-of-chapter page of a book being read, use the book being read as the target book; or in response to the current display interface being a book recommendation interface, acquire at least one first recommended book, and use the at least one first recommended book as the target book.

In an optional embodiment, the recommended book further includes a second recommended book in response to the current display interface being an end-of-chapter page of a book being read; and the topic recommendation apparatus further includes a processing module 84, configured to determine the second recommended book matching the target recommended topic based on information of respective recommended books in respective topic posts under the target recommended topic.

In an optional embodiment, when acquiring the target recommended topic matching the target book, the acquisition module 82 is configured to: determine candidate recommended topics whose matching degree with the target book is greater than a set threshold; and sort the candidate recommended topics based on a total number of converted readers corresponding to each of the candidate recommended topics, and determine the target recommended topic from the candidate recommended topics based on a sorting result, in which the total number of converted readers refers to a total number of new users who read books included in the candidate recommended topics after reading the candidate recommended topics.

In an optional embodiment, the acquisition module 82 determines a matching degree between the target book and any topic by the following step: determining, for any topic, a matching degree between the topic and the target book based on first classification information of the topic and second classification information of the target book.

In an optional embodiment, the first classification information and the second classification information each have multiple classification levels; and when determining, for any topic, the matching degree between the topic and the target book based on the first classification information of the topic and the second classification information of the target book, the acquisition module 82 is configured to: determine, for any classification level, a level matching degree between the topic and the target book at the classification level, based on first classification level information of the first classification information at the classification level and second classification level information of the second classification information at the classification level; and determine the matching degree between the topic and the target book based on level matching degrees respectively determined at the multiple classification levels.

In an optional embodiment, when displaying the recommended book and the target recommended topic according to a display manner matching the preset display condition, the display module 83 is configured to: in response to the preset display condition including the current display interface being an end-of-chapter page of a book being read, sequentially display respective target recommended topics on the end-of-chapter page, and display respective recommended books matching each target recommended topic under each target recommended topic; or in response to the preset display condition including the current display interface being a book recommendation interface, sequentially display respective recommended books on the book recommendation interface, and display respective target recommended topics matching each recommended book on the book recommendation interface.

In an optional embodiment, in response to the current display interface being an end-of-chapter page of a book being read, when displaying respective recommended books matching each target recommended topic, the display module 83 is configured to: determine a display order of the respective recommended books based on respective reading popularity corresponding to the respective recommended books under each target recommended topic, and sequentially display the respective recommended books according to a determined display order under each target recommended topic.

In an optional embodiment, in response to the current display interface being a book recommendation interface, when sequentially displaying respective recommended books on the book recommendation interface, the display module 83 is configured to: determine a display order of the respective recommended books based on book consumption features respectively corresponding to the respective recommended books, in which the book consumption features include a total number of readers and a reading duration; and display the respective recommended books on the book recommendation interface, based on the determined display order of the respective recommended books.

In an optional embodiment, when displaying the target recommended topic, the display module 83 is configured to: acquire topic attribute information corresponding to the target recommended topic; generate a recommendation reason for the target recommended topic based on at least one of: (i) the topic attribute information corresponding to the target recommended topic, and (ii) respective first recommended books matching the target recommended topic, in which the recommendation reason is used for establishing an association between the target recommended topic and the respective first recommended books; replace an original text of the target recommended topic based on a target text corresponding to the recommendation reason for the target recommended topic; and display an updated target recommended topic based on the target text.

In an optional embodiment, after displaying the recommended book and the target recommended topic, the display module 83 is further configured to: in response to a first trigger operation on the target recommended topic, determine, from respective topic posts under the target recommended topic, a target topic post related to the recommended book; in response to having multiple target topic posts, display a topic post directory corresponding to the target topic posts, and in response to a second trigger operation on any target topic post in the topic post directory, display the target topic post; or in response to having one target topic post, display the target topic post.

The descriptions of processing flows of the modules and the interaction flows between the modules in the apparatus may be referred to the relevant descriptions in the above-mentioned method embodiments, and will not be described in detail herein.

Figure 9:
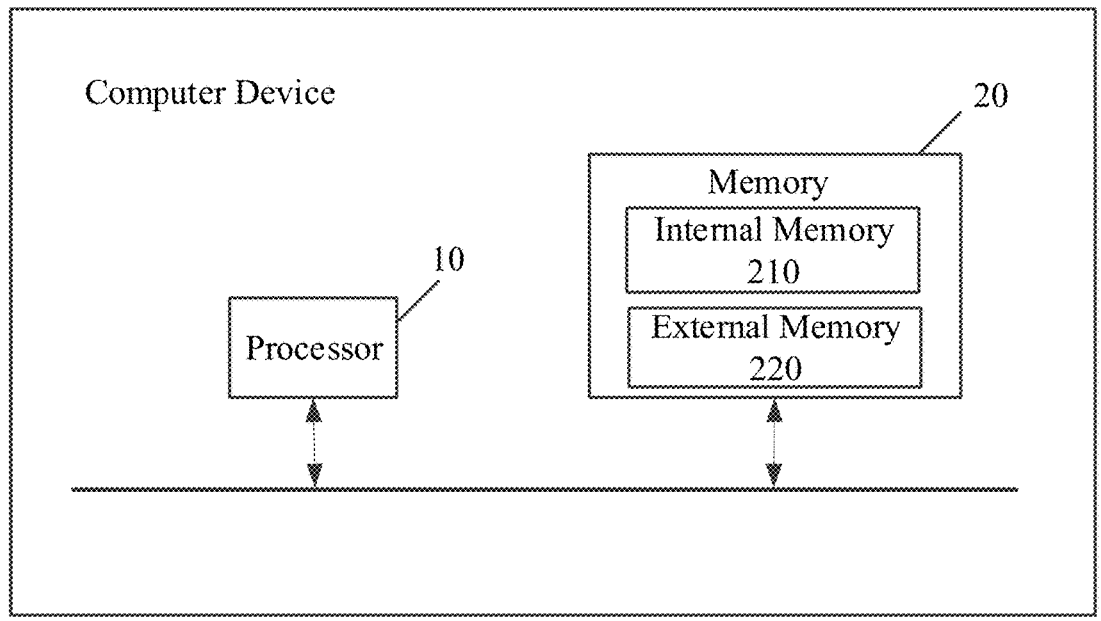
FIG. 9 illustrates a schematic diagram of a computer device according to the embodiments of the present disclosure.

The embodiments of the present disclosure further provide a computer device. FIG. 9 is a schematic structural diagram of a computer device according to an embodiment of the present disclosure. The computer device includes a processor 10 and a memory 20.

The memory 20 stores machine-readable instructions executable by the processor 10, the processor 10 is configured to execute the machine-readable instructions stored in the memory 20, and when the machine-readable instructions are executed by the processor 10, the processor 10 performs the following steps:

in response to satisfying a preset display condition, determining a target book to be displayed under the preset display condition; acquiring a target recommended topic matching the target book; and displaying a recommended book and the target recommended topic according to a display manner matching the preset display condition, in which the recommended book at least includes the target book.

The above-mentioned memory 20 includes an internal memory 210 and an external memory 220. The internal memory 210, also referred to as an internal storage, is used for temporary storage of computing data in the processor 10, as well as data exchanged with the external memory 220, such as a hard disk. The processor 10 exchanges data with the external memory 220 through the internal memory 210.

The specific execution process of the above-mentioned instructions may be referred to the steps of the topic recommendation method described in the embodiments of the present disclosure, and will not be repeated herein.

The embodiments of the present disclosure further provide a computer-readable storage medium, and the computer-readable storage medium stores a computer program. When the computer program is executed by a processor, the steps of the topic recommendation method described in the method embodiments above are performed. The storage medium may be a volatile or non-volatile computer-readable storage medium.

The embodiments of the present disclosure further provide a computer program product, which carries program code. The program code includes instructions that may be configured to execute the steps of the topic recommendation method described in the above-mentioned method embodiments, which may be specified in the above-mentioned method embodiments, and will not be repeated herein.

The computer program product may be implemented specifically by means of hardware, software or a combination thereof. In an optional embodiment, the computer program product is specifically embodied as a computer storage medium, and in another optional embodiment, the computer program product is specifically embodied as a software product, such as an SDK (Software Development Kit), and the like.

It may be clearly understood by the person skilled in the art that, for the purpose of convenient and brief description, for a detailed working process of the foregoing system and apparatus, reference may be made to a corresponding process in the foregoing method embodiments, and details are not described again herein. In some embodiments provided by the present disclosure, it should be understood that the disclosed system, apparatus, and method may be implemented in other modes. For example, the apparatus embodiments as described above are only schematic, for example, the division of the units may be logical functional division; in actual implementation, there may be other division modes; for another example, a plurality of units or components may be combined or integrated into another system, or some features may be ignored or not executed. On the other hand, the displayed or discussed mutual coupling or direct coupling or communication connection may be implemented by using some communication interfaces. The indirect coupling or communication connection between the apparatuses or units may be implemented in electronic, mechanical, or other forms.

The above-mentioned units illustrated as separate components may be, or may not be physically separated, and the components displayed as units may be, or may not be, physical units, that is, they may be at one place, or may also be distributed to a plurality of network units; and some or all of the units may be selected according to actual needs to achieve the purpose of the solutions of the present embodiment.

In addition, the respective functional units in the respective embodiments of the present disclosure may be integrated in one processing unit, or each unit may physically exist separately, or two or more units may be integrated in one unit.

In the case where the functions are implemented in a form of software functional unit and sold or used as an independent product, the functions may be stored in a non-volatile computer-readable storage medium executable to the processor. Based on such understanding, the technical solutions of the present disclosure essentially, or part of the technical solutions may be implemented in a form of a software product. The computer software product is stored in a storage medium and includes several instructions so that a computer device (which may be a personal computer, a server, or a network device, etc.) to execute all or part of steps of the methods according to the respective embodiments of the present disclosure. The foregoing storage medium includes a USB flash disk, a removable hard disk, a Read-Only Memory (ROM), a Random-Access Memory (RAM), a magnetic disk or an optical disk, and various other media that can store program code.

Finally, it should be noted that the above-mentioned embodiments are only specific implementations of the present disclosure and used to illustrate the technical solutions of the present disclosure, and are not intended to limit the present disclosure; and the protection scope of the present disclosure is not limited thereto; although the present disclosure has been described in detail with reference to the foregoing embodiments, those ordinarily skilled in the art should understand that within the technical scope disclosed in the present disclosure, any person of skill familiar with the technical field can still modify or conceive of changes to the technical solutions recorded in the foregoing embodiments, or make equivalent substitutions for some of the technical features therein; and these modifications, changes or substitutions do not cause the essence of the corresponding technical solutions to deviate from the spirit and scope of the technical solutions of the embodiments of the present disclosure, all of which shall be covered within the protection scope of the present disclosure. Therefore, the protection scope of the present disclosure shall be subject to the protection scope of the claims.

The invention claimed is:

1. A topic recommendation method, comprising:
in response to satisfying a preset display condition, determining a target book to be displayed under the preset display condition;
determining candidate recommended topics whose matching degree with the target book is greater than a set threshold;
sorting the candidate recommended topics based on a total number of converted readers corresponding to each of the candidate recommended topics, wherein the total number of converted readers refers to a total number of new users who read books comprised in the candidate recommended topics after reading the candidate recommended topics;
determining at least one target recommended topic from the candidate recommended topics based on a sorting result; and
displaying at least one recommended book and the target recommended topic according to a display manner matching the preset display condition, wherein the recommended book at least comprises the target book.

2. The method according to claim 1, wherein the preset display condition comprises at least one of the following: the current display interface being an end-of-chapter page of a book being read, and the current display interface being a book recommendation interface; and
the in response to satisfying the preset display condition, determining the target book to be displayed under the preset display condition, comprises:
in response to the current display interface being an end-of-chapter page of a book being read, using the book being read as the target book; or
in response to the current display interface being a book recommendation interface, acquiring at least one first recommended book, and using the at least one first recommended book as the target book.

3. The method according to claim 2, wherein the recommended book further comprises a second recommended book in response to the current display interface being an end-of-chapter page of a book being read; and
the method further comprises:
determining the second recommended book matching the target recommended topic based on information of respective recommended books in respective topic posts under the target recommended topic.

4. The method according to claim 1, wherein a matching degree between the target book and any topic is determined by the following step:
determining, for any topic, a matching degree between the topic and the target book based on first classification information of the topic and second classification information of the target book.

5. The method according to claim 4, wherein the first classification information and the second classification information each have multiple classification levels; and the determining, for any topic, the matching degree between the topic and the target book based on the first classification information of the topic and the second classification information of the target book, comprises:
determining, for any classification level, a level matching degree between the topic and the target book at the classification level, based on first classification level information of the first classification information at the classification level and second classification level information of the second classification information at the classification level; and determining the matching degree between the topic and the target book based on level matching degrees respectively determined at the multiple classification levels.

6. The method according to claim 1, wherein the displaying the recommended book and the target recommended topic according to a display manner matching the preset display condition, comprises:

in response to the preset display condition comprising the current display interface being an end-of-chapter page of a book being read, sequentially displaying respective target recommended topics on the end-of-chapter page, and displaying respective recommended books matching each target recommended topic under each target recommended topic; or in response to the preset display condition comprising the current display interface being a book recommendation interface, sequentially displaying respective recommended books on the book recommendation interface, and displaying respective target recommended topics matching each recommended book on the book recommendation interface.

7. The method according to claim 6, wherein in response to the current display interface being an end-of-chapter page of a book being read, the displaying respective recommended books matching each target recommended topic comprises:

determining a display order of the respective recommended books based on respective reading popularity corresponding to the respective recommended books under each target recommended topic, and sequentially displaying the respective recommended books according to a determined display order under each target recommended topic.

8. The method according to claim 6, wherein in response to the current display interface being a book recommendation interface, sequentially displaying respective recommended books on the book recommendation interface comprises:

determining a display order of the respective recommended books based on book consumption features respectively corresponding to the respective recommended books, wherein the book consumption features comprise a total number of readers and a reading duration; and displaying the respective recommended books on the book recommendation interface, based on the determined display order of the respective recommended books.

9. The method according to claim 1, wherein displaying the target recommended topic comprises:

acquiring topic attribute information corresponding to the target recommended topic;

generating a recommendation reason for the target recommended topic based on at least one of: (i) the topic attribute information corresponding to the target recommended topic, and (ii) respective first recommended books matching the target recommended topic, wherein the recommendation reason is used for establishing an association between the target recommended topic and the respective first recommended books;

replacing an original text of the target recommended topic based on a target text corresponding to the recommendation reason for the target recommended topic; and displaying an updated target recommended topic based on the target text.

10. The method according to claim 1, wherein after displaying the recommended book and the target recommended topic, the method further comprises:

in response to a first trigger operation on the target recommended topic, determining, from respective topic posts under the target recommended topic, a target topic post related to the recommended book;

in response to having multiple target topic posts, displaying a topic post directory corresponding to the target topic posts, and in response to a second trigger operation on any target topic post in the topic post directory, displaying the target topic post; or in response to having one target topic post, displaying the target topic post.

11. A computer device, comprising a processor and a memory, wherein the memory stores machine-readable instructions executable by the processor, the processor is configured to execute the machine-readable instructions stored in the memory, and when the machine-readable instructions are executed by the processor, the processor performs a topic recommendation method, which comprises:

in response to satisfying a preset display condition, determining a target book to be displayed under the preset display condition;

determining candidate recommended topics whose matching degree with the target book is greater than a set threshold;

sorting the candidate recommended topics based on a total number of converted readers corresponding to each of the candidate recommended topics, wherein the total number of converted readers refers to a total number of new users who read books comprised in the candidate recommended topics after reading the candidate recommended topics;

determining at least one target recommended topic from the candidate recommended topics based on a sorting result; and displaying at least one recommended book and the target recommended topic according to a display manner matching the preset display condition, wherein the recommended book at least comprises the target book.

12. The computer device according to claim 11, wherein the preset display condition comprises at least one of the following: the current display interface being an end-of-chapter page of a book being read, and the current display interface being a book recommendation interface; and the in response to satisfying the preset display condition, determining the target book to be displayed under the preset display condition, comprises:

in response to the current display interface being an end-of-chapter page of a book being read, using the book being read as the target book; or in response to the current display interface being a book recommendation interface, acquiring at least one first recommended book, and using the at least one first recommended book as the target book.

13. The computer device according to claim 12, wherein the recommended book further comprises a second recommended book in response to the current display interface being an end-of-chapter page of a book being read; and the topic recommendation method further comprises:
determining the second recommended book matching the target recommended topic based on information of respective recommended books in respective topic posts under the target recommended topic.

14. The computer device according to claim 11, wherein a matching degree between the target book and any topic is determined by the following step:
determining, for any topic, a matching degree between the topic and the target book based on first classification information of the topic and second classification information of the target book.

15. The computer device according to claim 14, wherein the first classification information and the second classification information each have multiple classification levels; and the determining, for any topic, the matching degree between the topic and the target book based on the first classification information of the topic and the second classification information of the target book, comprises:
determining, for any classification level, a level matching degree between the topic and the target book at the classification level, based on first classification level information of the first classification information at the classification level and second classification level information of the second classification information at the classification level; and
determining the matching degree between the topic and the target book based on level matching degrees respectively determined at the multiple classification levels.

16. The computer device according to claim 11, wherein the displaying the recommended book and the target recommended topic according to a display manner matching the preset display condition, comprises:
in response to the preset display condition comprising the current display interface being an end-of-chapter page of a book being read, sequentially displaying respective target recommended topics on the end-of-chapter page, and displaying respective recommended books matching each target recommended topic under each target recommended topic; or
in response to the preset display condition comprising the current display interface being a book recommendation interface, sequentially displaying respective recommended books on the book recommendation interface, and displaying respective target recommended topics matching each recommended book on the book recommendation interface.

17. The computer device according to claim 16, wherein in response to the current display interface being an end-of-chapter page of a book being read, the displaying respective recommended books matching each target recommended topic comprises:
determining a display order of the respective recommended books based on respective reading popularity corresponding to the respective recommended books under each target recommended topic, and sequentially displaying the respective recommended books according to a determined display order under each target recommended topic.

18. The computer device according to claim 16, wherein in response to the current display interface being a book recommendation interface, sequentially displaying respective recommended books on the book recommendation interface comprises:
determining a display order of the respective recommended books based on book consumption features respectively corresponding to the respective recommended books, wherein the book consumption features comprise a total number of readers and a reading duration; and
displaying the respective recommended books on the book recommendation interface, based on the determined display order of the respective recommended books.

19. The computer device according to claim 11, wherein displaying the target recommended topic comprises:
acquiring topic attribute information corresponding to the target recommended topic;
generating a recommendation reason for the target recommended topic based on at least one of: (i) the topic attribute information corresponding to the target recommended topic, and (ii) respective first recommended books matching the target recommended topic, wherein the recommendation reason is used for establishing an association between the target recommended topic and the respective first recommended books;
replacing an original text of the target recommended topic based on a target text corresponding to the recommendation reason for the target recommended topic; and
displaying an updated target recommended topic based on the target text.

20. A non-transitory computer-readable storage medium, storing a computer program, wherein when the computer program is executed by a computer device, the computer device performs a topic recommendation method, which comprises:
in response to satisfying a preset display condition, determining a target book to be displayed under the preset display condition;
determining candidate recommended topics whose matching degree with the target book is greater than a set threshold;
sorting the candidate recommended topics based on a total number of converted readers corresponding to each of the candidate recommended topics, wherein the total number of converted readers refers to a total number of new users who read books comprised in the candidate recommended topics after reading the candidate recommended topics;
determining at least one target recommended topic from the candidate recommended topics based on a sorting result; and
displaying at least one recommended book and the target recommended topic according to a display manner matching the preset display condition, wherein the recommended book at least comprises the target book.

* * * * *